(No Model.)
D. BROOKS, Jr.
METHOD OF INTRODUCING MOLTEN INSULATING MATERIAL INTO UNDERGROUND CONDUITS.
No. 408,574. Patented Aug. 6, 1889.
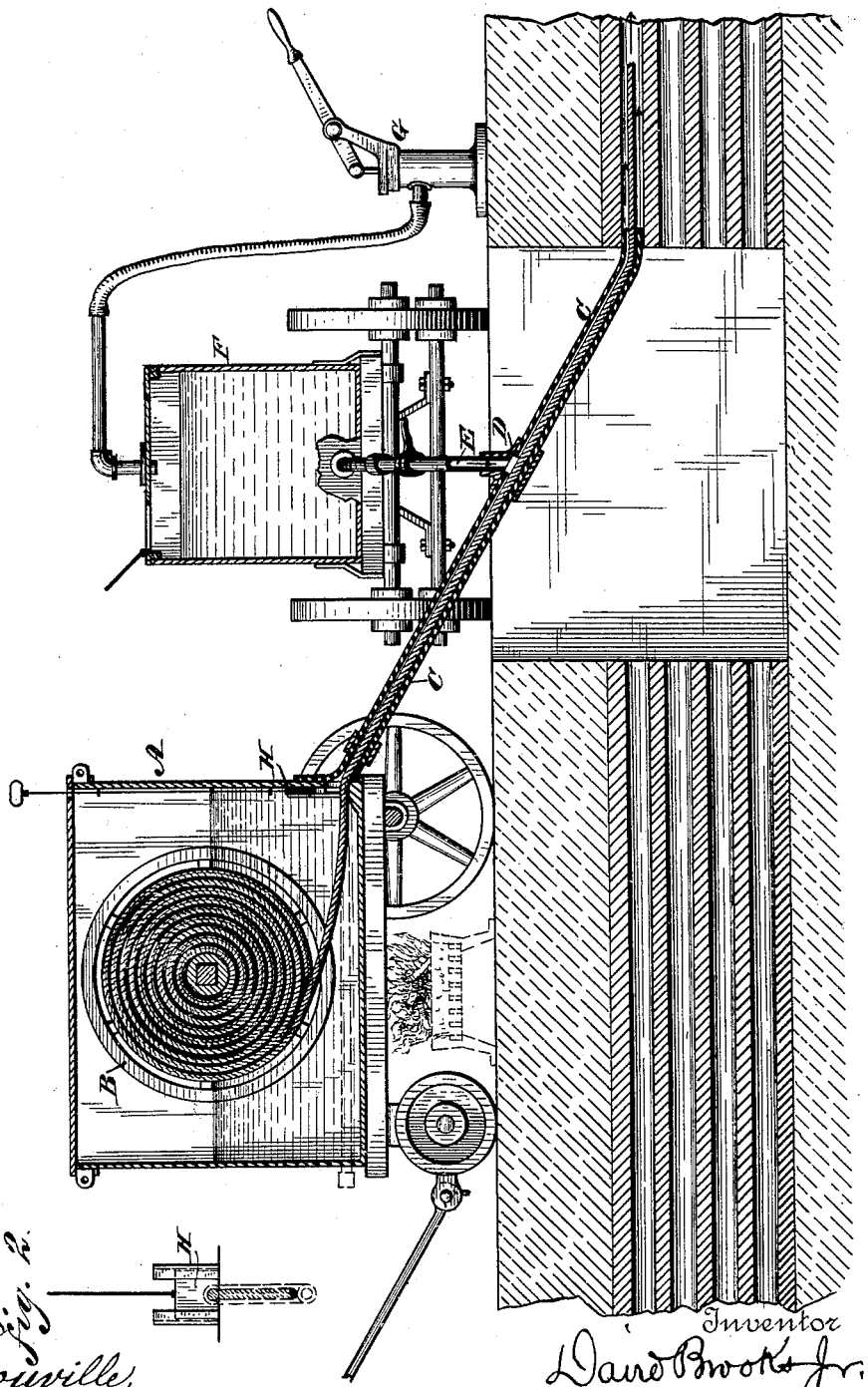

UNITED STATES PATENT OFFICE.

DAVID BROOKS, JR., OF PHILADELPHIA, PENNSYLVANIA, ASSIGNOR TO THE ELECTRIC CABLE CONSTRUCTION AND MAINTENANCE COMPANY, OF PENNSYLVANIA.

METHOD OF INTRODUCING MOLTEN INSULATING MATERIAL INTO UNDERGROUND CONDUITS.

SPECIFICATION forming part of Letters Patent No. 408,574, dated August 6, 1889.

Application filed January 21, 1889. Serial No. 296,993. (No model.)

*To all whom it may concern:*

Be it known that I, DAVID BROOKS, Jr., a citizen of the United States, residing in the city and county of Philadelphia, State of Pennsylvania, have invented a new and useful Improvement in Methods of Introducing Molten Insulating and other Molten Material into Underground Conduits, &c., for Electric Wires and Cables, which improvement is fully set forth in the following specification and accompanying drawings.

My invention consists of a novel method of introducing insulating, coating, preserving, or other material in molten liquid condition into an underground conduit, duct, &c., for electric wires, said conduit having been previously heated throughout its entire length.

Figure 1 represents a longitudinal vertical section of an apparatus employed for the method of introducing hot insulating and other melted liquid material into conduits, &c., embodying my invention. Fig. 2 represents a detached view of one of the valves or cocks of the apparatus.

Similar letters of reference indicate corresponding parts in the two figures.

Referring to the drawings, A designates a tank, which is mounted on wheels, whereby it may be readily conveyed from place to place. Within the tank is a reel B, on which is wound an electric wire or cable, and which is properly mounted within said tank.

C designates an air-tight tube or pipe of suitable material, which is connected with the tank A and communicates with the interior of the same, said pipe having a branch D, to which is attached the pipe E, which is secured to the closed or air-tight tank F, the latter being mounted on wheels for evident purposes.

Connected with the tank F is a forcing apparatus G, whereby the contents of said tank may be subjected to pressure, and thus forcibly expelled from the tank into the pipe C.

Within the tank A, at the discharge-opening thereof, is a valve or stop-cock H, the object of the same being hereinafter set forth.

The operation is as follows: The tank A is supplied with material suitable for insulating, coating, and protecting an electric wire or cable. Hot air is first driven into the conduit through the pipe C, so as to thoroughly dry and heat the same and prevent chilling of the material subsequently introduced thereinto. Heat is applied to the tank so as to melt said material and retain it in proper fluid condition, said heat being obtained from a fire, steam-pipe, jacket, or other means, the tank being preferably made of metal. The pipe C has one end tightly inserted in a conduit, duct, &c., and the wire or cable is run from the reel and passed through the pipe C, the valve H being opened. The wire or cable is then drawn through the conduit, and the fluid material from the tank follows the same through the pipe or conductor C, whereby the wire or cable is insulated, coated, or preserved, as the case may be. In the event of the failure of the material to reach the end of the conduit or to enter the conduit in sufficient quantities, or to accomplish its work prior to chilling, the tank F is supplied with suitable material and heated so that said material is discharged through the pipe E into the pipe C. The pump or apparatus G is now operated, the valve H being closed, and the material is forced into the conduit and fully and properly supplies the same.

As the valve H is closed, the liquid material passing through the pipe C from the tank F is prevented from being forced into the tank A.

It is evident that the forcing apparatus may be connected with the tank A, and that the tank F may be placed in communication with the conduit at the end opposite to the pipe C, or at a man-hole, or the hot blast may be connected with the pipe C at the branch D. Again, the hot blast may be applied after the cable has been pulled or laid some time, then the melted insulating or protecting material forced through. Furthermore, the conduit may be heated by passing a hot gas, oil, or other fluid under pressure through the conduit, and following the same with the molten substance.

Having thus described my invention, what I claim as new, and desire to secure by Letters Patent, is—

1. The method of introducing insulating or other material into a conduit for electric wires or cables, consisting in first heating the conduit and then passing said material simultaneously with the wire or cable from the containing-tank into the conduit, substantially as described.

2. The method of insulating and laying cable or electric wires, consisting, first, in heating the conduit by passing heated air under pressure through said conduit; second, passing the cable into said conduit, and, third, simultaneous with the passage of the cable to the conduit coating the same with a suitable insulating substance under pressure, substantially as described.

3. The method of preparing conduits and introducing cables or wires therein, consisting in first heating the conduits and then passing the cable into the said conduit, and simultaneously passing therein under pressure the insulating material, substantially as described.

DAVID BROOKS, JUN.

Witnesses:
JOHN A. WIEDERSHEIM,
A. P. JENNINGS.